(12) United States Patent
Chung

(10) Patent No.: US 6,686,096 B1
(45) Date of Patent: Feb. 3, 2004

(54) RECHARGEABLE SOLID STATE CHROMIUM-FLUORINE-LITHIUM ELECTRIC BATTERY

(75) Inventor: Hing Ka Chung, Shenzhen (CN)

(73) Assignee: New Billion Investments Limited (HK)

( * ) Notice: Subject to any disclaimer, the term of this patent is extended or adjusted under 35 U.S.C. 154(b) by 290 days.

(21) Appl. No.: 09/632,907

(22) Filed: Aug. 4, 2000

(30) Foreign Application Priority Data

Jan. 27, 2000 (CN) .......................... 101356 A

(51) Int. Cl.$^7$ .......................... H01M 6/18; H01M 6/00
(52) U.S. Cl. .................. 429/304; 429/321; 429/322; 29/623.1
(58) Field of Search ................ 429/304, 306, 429/307, 322, 324, 321, 326, 325, 330, 331, 332, 333; 252/62.2

(56) References Cited

U.S. PATENT DOCUMENTS

| | | | |
|---|---|---|---|
| 5,037,712 A | | 8/1991 | Shackle et al. |
| 5,296,318 A | * | 3/1994 | Gozdz et al. ............... 429/192 |
| 5,478,364 A | | 12/1995 | Mitate et al. |
| 5,631,104 A | | 5/1997 | Zhong et al. |
| 5,712,056 A | | 1/1998 | Matsumasa et al. |
| 5,968,683 A | | 10/1999 | Kolb |
| 6,001,505 A | * | 12/1999 | Fukuda et al. ............... 429/176 |
| 6,156,432 A | * | 12/2000 | Mabuchi et al. ............ 428/408 |
| 2001/0046628 A1 | | 11/2001 | Oesten et al. |

FOREIGN PATENT DOCUMENTS

| | | |
|---|---|---|
| AU | A-20790/92 | 2/1993 |
| EP | 0-413-313 A2 | 2/1991 |
| EP | 0-942-482 A2 | 9/1999 |
| EP | 942484 | 9/1999 |
| JP | 56109461 | 8/1981 |
| JP | 4-245170 | 9/1992 |
| JP | 8-162114 | 6/1996 |
| JP | 10-1 89045 | 7/1998 |
| JP | 10-255794 | 9/1998 |
| JP | 11-250914 | 9/1999 |
| WO | WO 00/23380 | 4/2000 |

OTHER PUBLICATIONS

Australian Patent Office, Corrected International Search Report for corresponding Hong Kong Short–Term patent application, Ref. No. CS/00/0048 (Sep. 18, 2000).

Letter by Kim Wellens (Australian Patent Office) re correction to first reference cited on second page of Australian search Report of Sep. 18, 2000 (Dec. 19, 2000).

Australian Patent Office, International Search Report for corresponding Hong Kong Short–Term patent application, Ref. No. CS/00/0048 (Sep. 18, 2000).

V. S. Bagotzky and A. M. Skundin, The Institute of Electrochemistry of the USSR academy of Sciences "Chemical Power Sources", Academic Press, 1980, pp. 322–323 (No month available).

Derwent Abstract No. 87–26 4600/38, DD 245–531, Lithium–Manganese di: oxide cell with specified tumescent layer compensating volumetric shrinkage and maintaining good contact (Techn. Univ. Dresden) May 6, 1987.

David Linden, Handbook of Batteries, pp. 36.4–36.9 (McGraw–Hill, Inc. $2^{nd}$. ed., 1995) No month available).

Australian Patent Office, International Search Report for Hong Kong short term patent application corresponding to 09/632,634; Ref. No. CS/00/0049 (Sep. 24, 2000).

* cited by examiner

*Primary Examiner*—Patrick Ryan
*Assistant Examiner*—Raymond Alejandro
(74) *Attorney, Agent, or Firm*—Hall, Priddy, Myers & VandeSande

(57) ABSTRACT

There is disclosed a solid state rechargeable electric battery (10) including a number of cathode plates (7) interposed among a number of anode plates (8) in which the cathode plate (7) includes an aluminium foil (41) coated with a layer of mixture (43) of lithium manganate, chromium and fluoride. The anode plate (8) includes a copper foil (47) coated with a layer of mixture (49) containing petroleum coke. Provided among the cathode plates (7) and anode plates (8) is a solid state electrolyte (14) made up of lithium perchlorate dissolved in ethylene carbonate and diethyl carbonate.

19 Claims, 4 Drawing Sheets

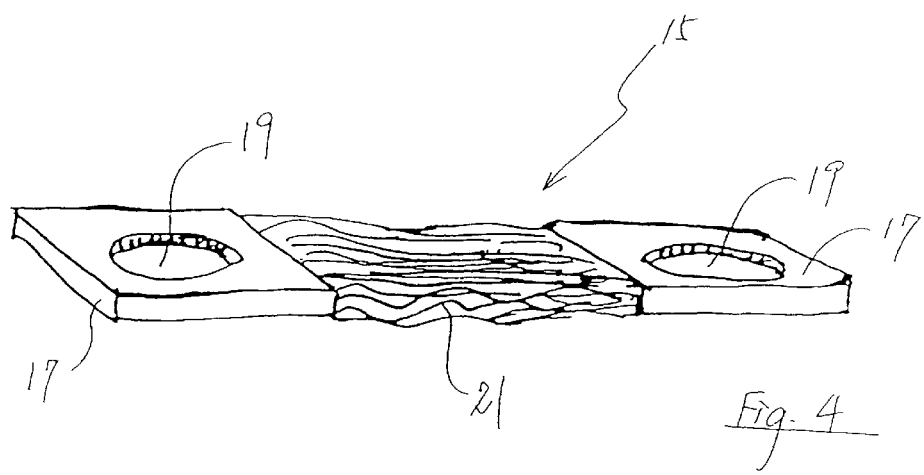
Fig. 4
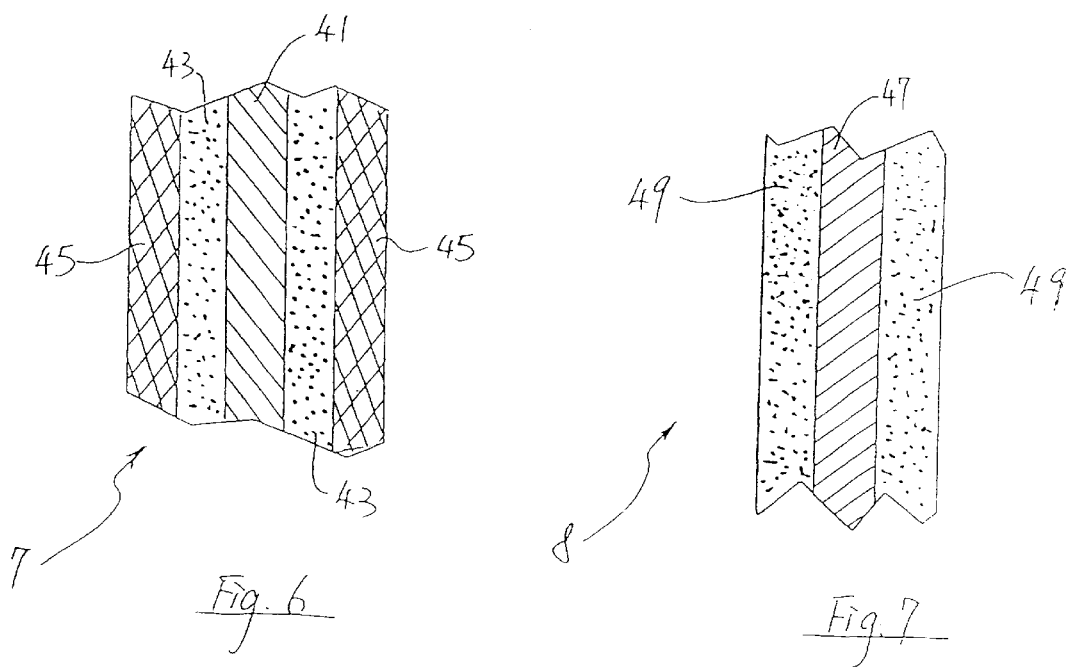
Fig. 6
Fig. 7

US 6,686,096 B1

RECHARGEABLE SOLID STATE CHROMIUM-FLUORINE-LITHIUM ELECTRIC BATTERY

This invention mainly relates to a solid state chromium-fluorine-lithium ("CrFLi") electric battery that can be discharged and recharged repeatedly, and to such an electric battery which may be used for powering electric vehicles, e.g. electric cars.

With a view to reducing pollution to the environment, various researches and studies are being carried out around the world for the development of electric batteries which may be used in place of petrochemical fuel for powering vehicles, e.g. cars. Lead-acid electric cells, nickel-cadmium electric cells, nickel-hydrogen electric cells and sodium-sulfur electric cells may at present be used as electric accumulators for powering vehicles. It is generally believed that lead-acid electric cells and nickel-cadmium electric cells may represent the most commercially and technologically promising and viable candidates as electric accumulators for electric power accumulators. Nonetheless, due to the relatively low energy to weight ratio of these two kinds of electric cells, the lengthy recharging time, and high requirements for maintenance, the development of electric cars has been directly affected.

With the further research and development of power electric batteries, zinc-air electric batteries, lithium ion electric batteries and proton-exchange membrane fuel electric batteries have also been considered to be the best power electric batteries for developing electric cars. However, the internal resistance of zinc-air electric batteries is large, and the technology for the replenishment of zinc ions has yet to be improved to be practical. As to lithium ion electric batteries, due to the deposition of metal cobalt and lithium during repeated charging, there is a risk of fire and explosion. As to proton-exchange membrane fuel electric batteries, such have been thought by some to be the ideal power source for powering electric cars. Nonetheless, there are yet a number of difficulties to be overcome. Various practical and technical problems have also been seriously hindering the development of the electric car industry.

An object of the present invention is to provide a rechargeable solid state chromium-fluorine-lithium electric battery. A further object of the present invention is to provide such a battery for use in powering electric vehicles, e.g. electric cars.

According to a first aspect of the present invention, there is provided a solid state rechargeable electric battery including at least an anode member and at least a cathode member, characterized in that a substantially solid electrolyte is provided between said at least one anode and said at least one cathode and wherein said electrolyte comprises lithium perchlorate, ethylene carbonate and diethyl carbonate. The battery does in one embodiment comprise an electrolyte that essentially consist of the recited components. In another embodiment the electrolyte is a dried product of a mixture of the aforementioned components in a liquid state wherein said electrolyte comprises said components in a relative liquid weight ratio of substantially 1:1:1. In yet another embodiment the electrolyte comprises around 5–10% of the combined total weight of said at least one anode member, said at least one cathode member and said electrolyte.

According to a second aspect of the present invention, there is provided a method of forming a solid state rechargeable electric battery, including the steps of (a) providing at least an anode member; (b) providing at least a cathode member; and (c) providing an injectable electrolyte between said at least one anode member and said at least one cathode member; characterized in that said electrolyte is substantially solid when said battery is formed.

Embodiments of the present invention will now be described, by way of examples only, and with reference to the accompanying drawings, in which:

FIG. 4 shows a connection member for electrically connecting the electric batteries shown in FIG. 1;

FIG. 6 shows an enlarged partial side view of a cathode plate of the electric battery shown in FIG. 1; and FIG. 7 shows an enlarged partial side view of an anode plate of the electric battery shown in FIG. 1.

Figure 1:
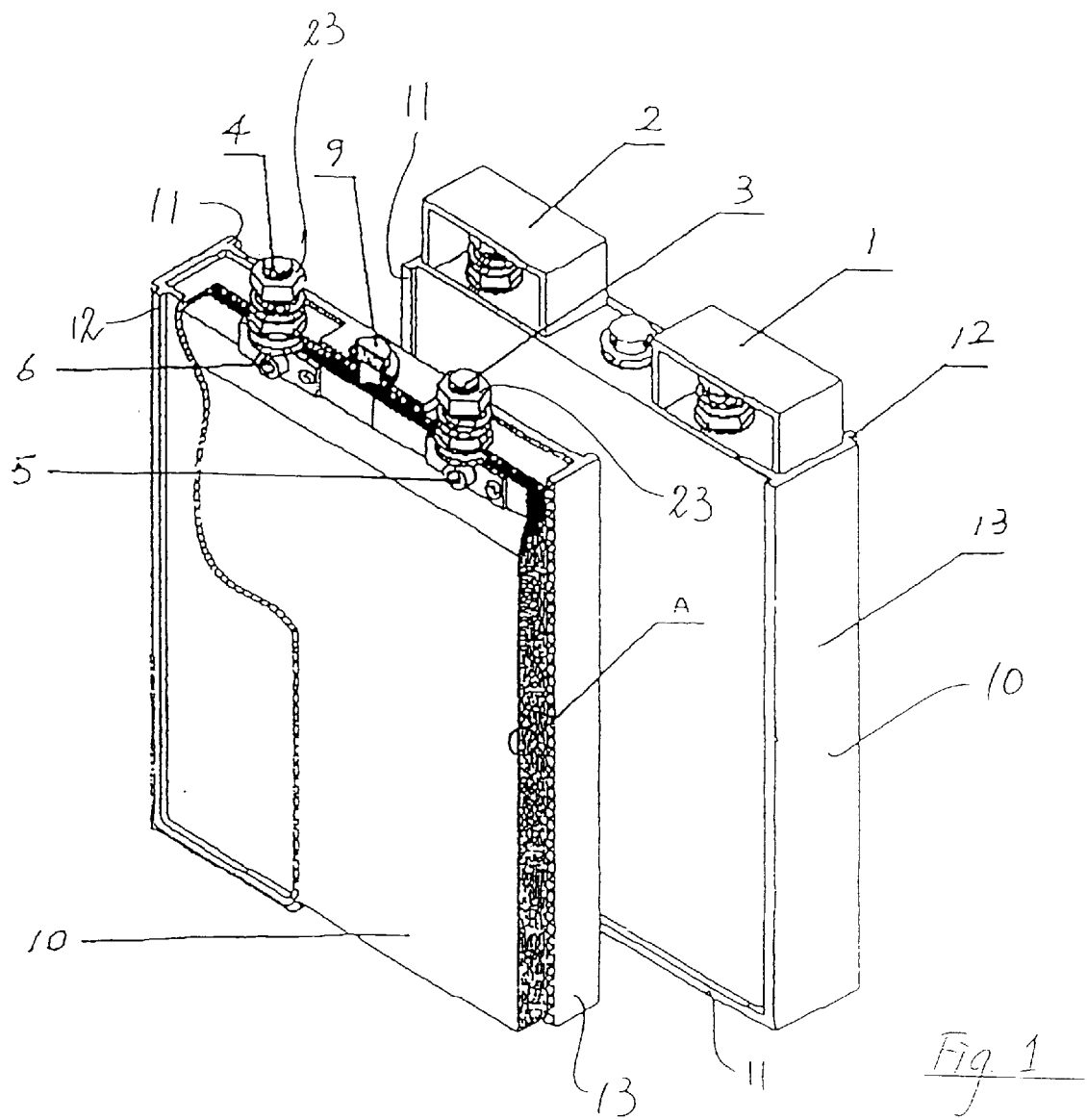
FIG. 1 shows two solid state chromium-fluorine-lithium ("CrFLi") electric batteries according to the present invention, in which one of said batteries is partially cut out for illustration purposes.

Two dischargeable and rechargeable solid state chromium-fluorine-lithium ("CrFLi") electric batteries 10 are shown in FIG. 1. Each battery 10 includes a number of cathode plates 7 interposed with a number of anode plates 8. While the cathode plates 7 and anode plates 8 are here shown as planar, they may alternatively be curved, in a rolled shape, or in other suitable configurations. The battery 10 includes a rigid outer housing 13, which may be made of polypropylene, or a nickel-plated metal. Alternatively, the housing 13 may be made of a soft package composed of polyurethane, aluminium foil and polyethylene.

On the top of the housing 13 are a cathode pole 3, an anode pole 4, and a gas release valve 9. The cathode pole 3 is connected with the cathode plates 7 in the housing 13, and the anode pole 4 is connected with the anode plates 8 in the housing 13. Provided among the cathode plates 7 and anode plates 8 is a solid state electrolyte, details of which will be discussed below. A safety cap 1 is positioned above the cathode pole 3, and a safety cap 2 is positioned above the anode pole 4. Both safety caps 1, 2 are made of polybenzothiazole. The safety caps 1, 2 can avoid accidental short-circuiting among anode poles 4 and cathode poles 3, when a number of batteries 10 are interconnected to form a battery assembly so as to be able to provide more power.

On one major surface of the housing 13 is provided with a raised ridge 12 which is inner of the bottom edge and side edges of this major surface. On another major surface of the housing 13 is provided with a side ridge 11 which runs along the bottom edge and two side edges of this major surface. The ridges 11 and 12 are so sized and configured that the ridge 12 of one battery 10 may be force-fitted with the side ridge 11 of another battery 10 so as to engage and secure the two batteries 10 together.

With regard to the lead-wires used in relation to this invention, pure aluminium is best for making the cathode lug 5 and purple copper coated with nickel for the anode lug 6 in the case of soft packing. In the case of a rigid housing, stainless aluminium is best for making the cathode pole 3 and purple copper coated with nickel for the anode pole 4.

A special thermal bonding method is best for the lead wires to be used in pole lugs of this invention in the case of soft packing. In this way, permanent sealing can be achieved. The rigid housing 13 should be sealed up and insulated with chlorotrifluoroethylene.

Figure 3:
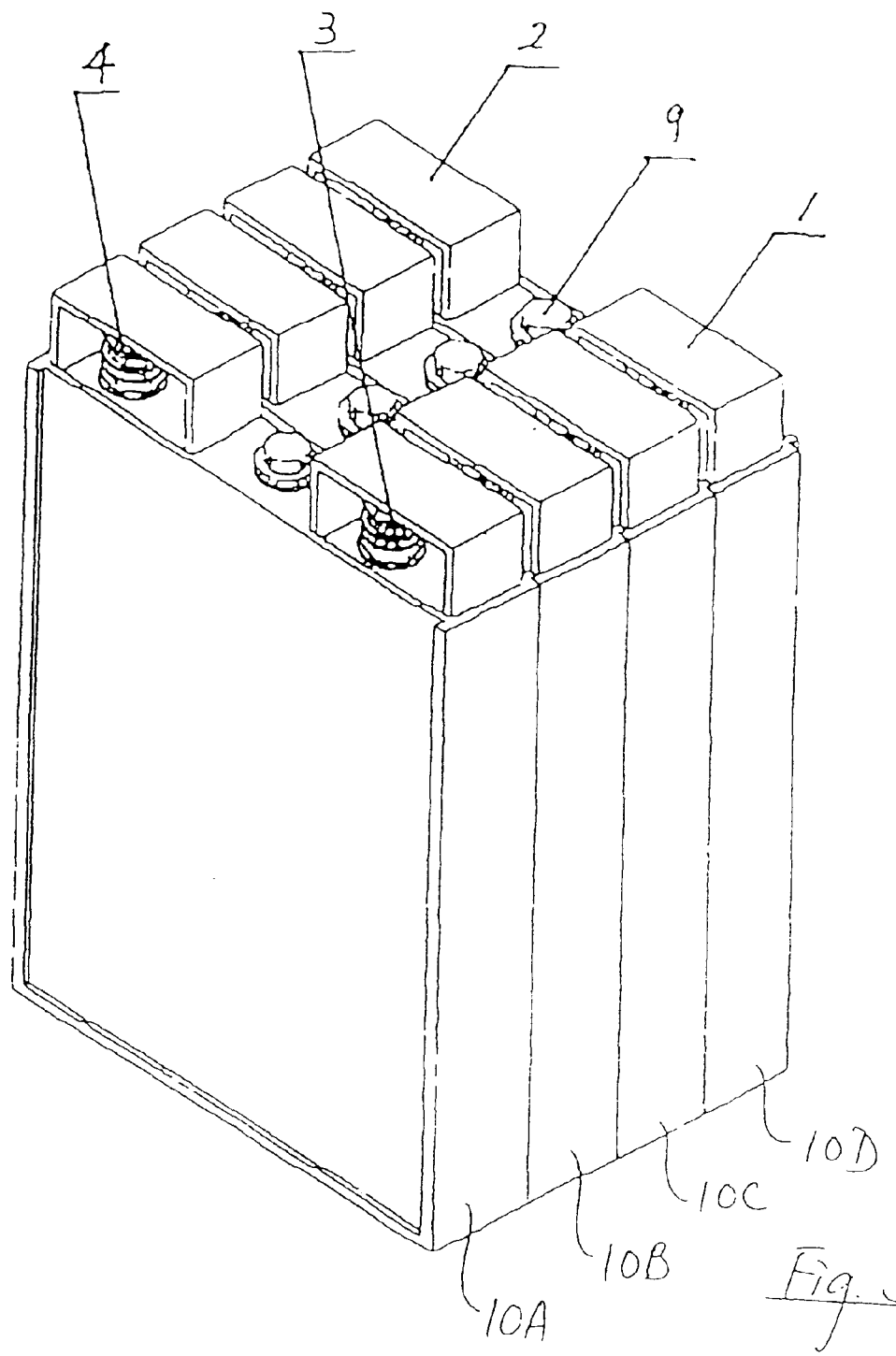
FIG. 3 shows an electric battery assembly constructed of a number of interconnected electric batteries shown in FIG. 1.

In FIG. 3, four batteries 10A, 10B, 10C, and 10D are shown as being engaged and secured with one another to form a battery assembly. The batteries 10A to 10D may be electrically connected in a number of ways. One may connect the batteries 10A to 10D in series, e.g. connect the cathode pole 3 of the battery 10A with the anode pole 4 of the battery 10B, and connect the cathode pole 3 of the battery 10B with the anode pole 3 of the battery 10C, and so on. Assuming that the output voltage of each of the four batteries 10A, 10B, 10C, 10D is the same, the output voltage of the battery assembly as shown in FIG. 3 (when connected in series) will then be four times the output voltage of each of the batteries 10A, 10B, 10C, and 10D. Alternatively, the batteries 10A, 10B, 10C, 10D may be connected in parallel by electrically connecting all the cathode poles 3 together, and electrically connecting all anode poles 4 together. Again, assuming that the output voltage of each of the four batteries 10A, 10B, 10C, 10D is the same, the output voltage of the battery assembly in FIG. 3 (when connected in parallel) will then be the same as the output voltage of the battery 10A, although the battery assembly can provide electricity at four times the capacity of the battery 10A, and for a longer time.

FIG. 4 shows a connecting member 15 which may be used for electrically connecting the electrode poles (i.e. the cathode poles 3 and the anode poles 4) of the batteries 10. The connecting member 15 includes two rigid electrically conducting end keys 17, each with a central hole 19. The end keys 17 are connected by a bundle of electrically conducting wires 21. Both the end keys 17 and the wires 21 may, for example, be made of steel. As can be seen in FIG. 1, each of the cathode pole 3 and the anode pole 4 is provided with an external thread over which a nut 23 may be threadedly engaged. The end key 17 of the connecting member 15 may thus be positioned over the cathode pole 3 or the anode pole 4, and secured thereto by the respective nut 23. The electrode poles of the various batteries 10 may thus be connected with one another as desired.

Figures 5A, 5B:
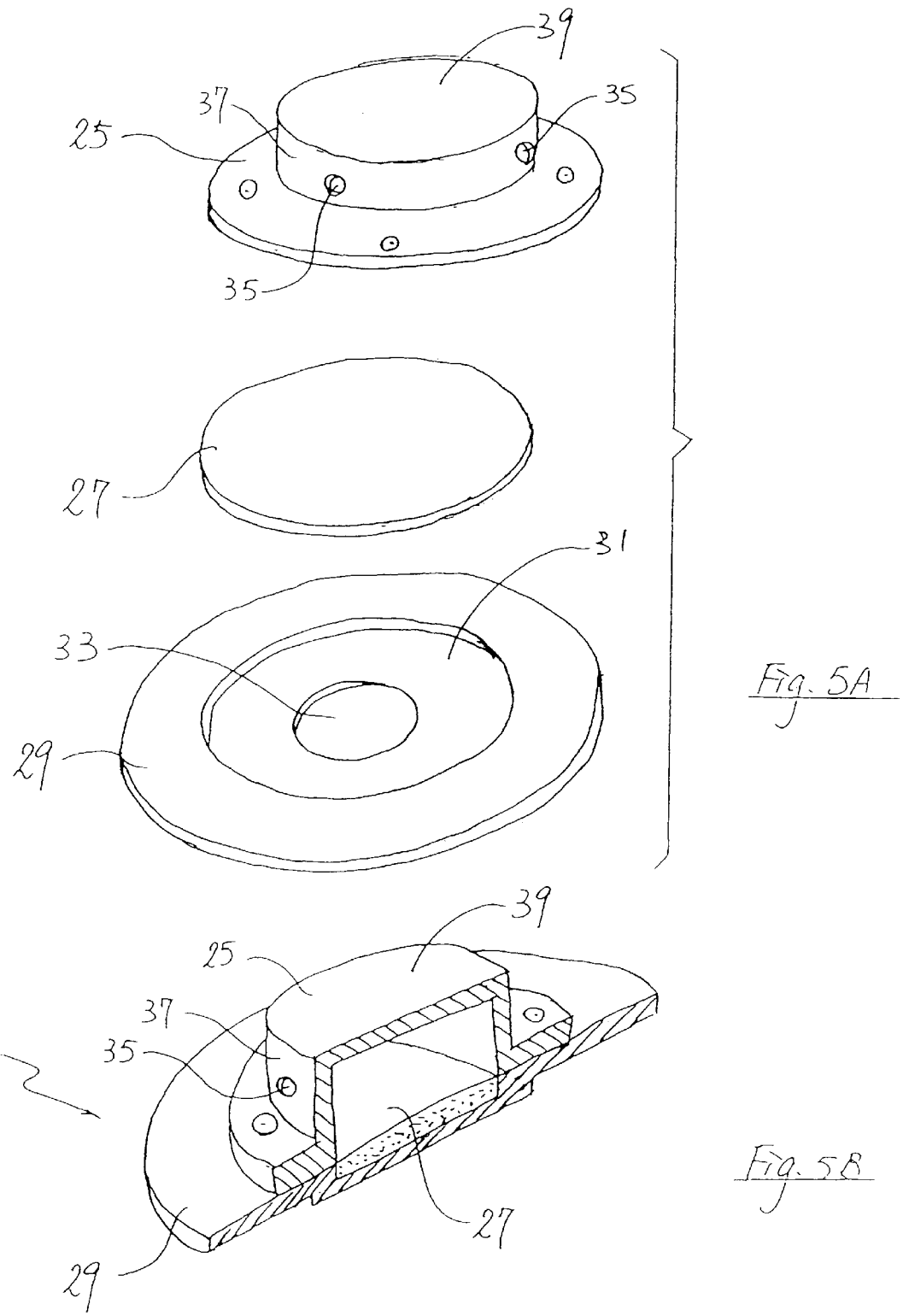
FIG. 5A shows an exploded perspective view of a gas release valve of the battery shown in FIG. 1.
FIG. 5B shows a sectioned perspective view of the gas release valve shown in FIG. 5A.

Turning to the gas release valve 9, such is shown in more detail in FIGS. 5A and 5B. As shown in these figures, the gas release valve 9 includes three components, namely an upper body portion 25, an elastic ethylene propylene terpolymer rubber piece 27, and a base plate 29. The base plate 29 includes a central recess 31 provided with a gas release aperture 33, which is connected to the interior of the electric battery 10. The rubber piece 27 is sized and shaped to be receivable within the recess 31 of the base plate 29. The upper body portion 25 includes a number of gas release holes 35 (of which two are shown in FIG. 5A) on a side wall 37 of a raised tubular portion 39. When assembled, the rubber piece 27 sits in the recessed 31 and closes the gas release aperture 33, and the upper body portion 25 is fixedly secured (e.g. by laser welding) to the base plate 29.

During the manufacture of the battery 10, gas of the solvent (e.g. ethylene carbonate, diethyl carbonate) of the electrolyte may be generated, which has to be released from the battery 10, so as to avoid explosion. When the internal gas pressure in the battery 10 exceeds a predetermined level (e.g. the atmospheric pressure), the gas from the gas release aperture 33 will exert an upward pressure on the bottom of the rubber piece 27, to cause the latter to bulge up, so that gas from the interior of the housing 13 of the battery 10 can enter the cavity of the raised tubular portion 39 of the upper body portion 25 via the gap left between the circular edge of the rubber piece 27 and the base plate 29, and thence to the outside environment via the gas release holes 35. While the generation of gas usually only occurs during the first formation/production of the battery 10, for safety sake, this gas release valve 9 is retained in the battery 10, so as to ensure that in case the internal pressure of the battery 10 exceeds the predetermined level during recharging and or discharging of the battery 10, the gas inside the battery 10 will be released, and that the gas release aperture 33 (and thus the valve 9) will be properly closed when the internal pressure of the battery 10 is lower than the predetermined level.

The gas release valve of conventional lithium ion electric batteries and alkaline batteries (e.g. those used in portable computers) mainly makes use of the rupture membrane structure, in which when the internal pressure of the battery exceeds the predetermined level, the membrane will rupture (i.e. break) to allow gas to be released from the interior of the battery to the outside environment. However, with the rupture of the membrane, the battery can no longer be used. For specially designed high power electric batteries, the gas release valve is mainly of the spring-ball closure structure in which a closure ball is biased by a spring towards a position to close the valve. However, when the internal gas pressure of the battery exceeds the designed level, the closure ball will be moved by the gas in the battery, against the biasing force of the spring, and away from the closed position so as to release the gas in the battery to the outside environment.

The structure of the conventional gas release valves discussed in the preceding paragraph is rather complicated and requires precise machining. In addition, the rupture membrane structure is not suitable for large-current repeatedly rechargeable and dischargeable electric batteries. As to the spring-ball closure valve, deformation, e.g. of the spring, may occur as a result of being under pressure for a long period of time. In addition, the production cost of such a valve is high.

On the other hand, the ethylene propylene terpolymer rubber piece 27 used in the present invention possesses the following advantages:

a. it is resistant to acids, alkalis and organic chemicals;

b. there exists a linear relationship between the pressure and the extent of deformation;

c. there is no change to the elasticity upon prolonged and repeated use;

d. relatively low price;

e. easy to manufacture, and does not require precise machining; and f. good closure effect.

A gas release valve with a closure membrane made of ethylene propylene terpolymer rubber is thus best suited for use in repeatedly dischargeable and rechargeable electric batteries, as in the present invention.

FIG. 6 shows an enlarged partial side view of a cathode plate 7 of the present invention. The cathode plate 7 includes an aluminium foil 41 of a thickness of 0.3 mm. On both major surfaces the aluminium foil 41 is coated with a layer 43 made of the following ingredients:

83–90.5 wt % of lithium manganate (in spinel type structure, which may be obtained from UMEX Inc., of Belgium);

1–2 wt % of chromium;

1.5–3 wt % of lithium fluoride;

5–8 wt % of acetylene black; and

2–4 wt % of graphite.

The above ingredients are then mixed and dissolved in water and/or ethanol, and subsequently coated onto the aluminium foil 41. The layer 43 will solidify when the coated aluminium foil 41 is heated up to around 300° C. The thickness of the layer 43 is around 0.25 mm. On top of each of the layers 43 is a further dividing layer 45 made of a tribasic acrylic acid. Each of these dividing layers 45 is of a thickness of about 0.1 mm. When the aluminium foil 41 is again heated up to dry/solidify the dividing layers 45, a unitary cathode plate 7 will form. It is found in practice that the aluminium foil 41 has to be thicker than each of the coating layers 43. It is also found in practice that the existence of chromium allows the battery 10 to be recharged or to discharge at a rate of over 1C of its designed capacity. The meaning of the symbol "C" will be discussed herebelow. As to fluoride, it is found that such allows the battery 10 to discharge at a high temperature of over 50° C.

As to the anode plate 8 shown in FIG. 7, such includes a copper foil 47 of a thickness of around 0.35 mm. On both major surfaces of the copper foil 47 is coated with a layer 49 of a thickness of around 0.36 mm. The layer 49 is made of a mixture of:

petroleum coke ground to a particulate size of 30–40 μm;

1–2 wt % of graphite; and 0.5–1 wt % of acetylene black.

These ingredients are mixed and dissolved in water and/or ethanol as solvent, and subsequently applied onto the copper foil 47. The copper foil 47 is then dried by heating, whereby a unitary anode plate 8 is formed. It is found in practice that each of the layers 49 has to be thicker than the copper foil 47.

Figure 2:
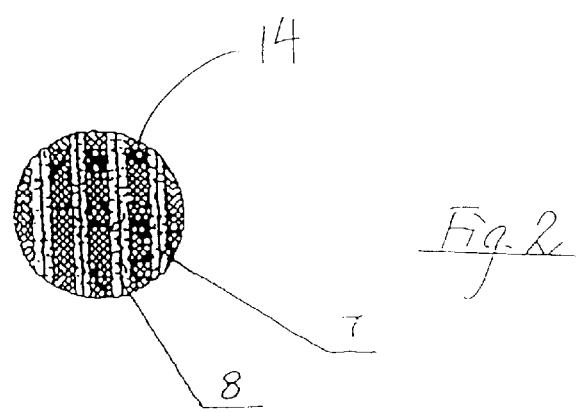
FIG. 2 shows an enlarged view of the encircled portion marked "A" in FIG. 1.

When the cathode plates 7 and the anode plates 8 are interposed with one another as discussed above, a dissolved electrolyte is then injected into the space among the cathode plates 7 and anode plates 8. The electrolyte is substantially made up of ⅓ in weight of liquid lithium perchlorate ($LiClO_4$), ⅓ in weight of liquid ethylene carbonate ($HOCOOCH=CH_2$) and ⅓ in weight of liquid diethyl carbonate ($CH_3CH_2OCOOCH_2CH_3$). The electrolyte (together with the ethylene carbonate and the diethyl carbonate) is around 5–10% of the weight of the battery 10 (minus the outer casing). When the electrolyte is dried up, such will be in a solid form and substantially free of any liquid, as shown by numeral 14 in FIGS. 1 and 2.

In order to maximize the usable life and capacity of the electric battery made in accordance with the present invention, it is found in practice that when the battery is first manufactured, such should be charged for the first time at a substantially constant temperature above 48° C. (with a variation of no more than ±0.1% of the mean temperature), and at a rate of 0.1C to 0.2C of the designed capacity of the single battery 10. The meaning of the symbol "C" as used in the field of the manufacture and design of electric batteries may be understood from the following table:

TABLE 1

| Battery Capacity | Charging/Discharging Rate | Charging/Discharging Current |
|---|---|---|
| 100 Ah (Ampere-hour) | 1 C | 100 A |
|  | 2 C | 200 A |
|  | 5 C | 500 A |
|  | 0.1 C | 10 A |
|  | 0.2 C | 20 A |
| 200 Ah | 1 C | 200 A |
|  | 2 C | 400 A |
|  | 5 C | 1,000 A |
|  | 0.1 C | 20 A |
|  | 0.2 C | 40 A |

An electric battery manufactured as discussed above may be directly used in an electric car as a source of electric power. After the first formation of the battery, it may be rapidly recharged at more than 3C of the designed capacity of the battery 10.

The use of lithium perchlorate as the electrolyte in the solid state conducting base not only significantly lowers the production cost, but also increases the usable life of the battery and increases its stability in high temperature. It is found in practice that such a battery is safe even if dissembled and exposed to the environment, as it is non-toxic. It may be repeatedly recharged and discharged for over 2,000 times, and the capacity can still remain at least 75%.

The storing temperature of a battery according to the present invention can be from −40° C. to 70° C., and its working temperature can be from −20° C. to 60° C. It is usually discharged at a rate of 2C of the designed capacity of the single battery 10, but may also be discharged at pulse at a rate of up to 5C of the designed capacity of the single battery 10, if necessary.

It is found in practice that a solid state electric battery constructed in accordance with the present invention is both simple and compact, non-toxic, high in power, can withstand discharge and recharge at a large current rate, can be recharged at a relatively short time, is of a long usable life, and can be recharged and discharged repeatedly.

As the crystal structure of $LiMn_2O_4$ is very stable after being mixed with other ingredients, e.g. chromium and fluorine, there will be no change to the crystal structure even at a high temperature and upon repeated charging and discharging. It is thus safe even to charge each battery 10 up to 5V, its production cost is roughly one half of that of $LiCoO_2$ battery. The use of ground petroleum coke as a raw material in the manufacture of the anode also significantly reduces the production cost of the present battery.

The CrFLi solid power battery according to this invention may not only be applied to electrically-powered vehicles and other kinds of battery-driven transportation locomotives, but also be grouped into battery containers of different power by series connection or parallel connection to meet other power requirements, such as standby power supply for communications apparatus, power stations and control facilities, power supply for electrical appliances, and to provide lighting in remote villages, out posts and field work areas, and to serve as future domestic power reserve.

The repeatedly rechargeable and dischargeable CrFLi battery according to this invention can be manufactured into batteries for portable phones, small-sized batteries for electronic diaries, computers, video cameras, cameras etc, and batteries for domestic standby power supply of high power.

What is claimed is:

1. A solid state rechargeable electric battery including at least an anode member and at least a cathode member, characterized in that a substantially solid electrolyte is provided between said at least one anode member and said at least one cathode member, wherein said electrolyte consists essentially of lithium perchlorate dissolved in ethylene carbonate and diethyl carbonate.

2. A battery including at least an anode member and at least a cathode member, characterized in that a substantially solid electrolyte is provided between said at least one anode member and said at least one cathode member, wherein said electrolyte is a dried product of a mixture comprising lithium perchlorate dissolved in ethylene carbonate and diethyl carbonate in a liquid state wherein said electrolyte comprises lithium perchlorate, ethylene carbonate and diethyl carbonate in a relative liquid weight ratio of substantially 1:1:1.

3. A battery according to claim 2 wherein, prior to assembly of the battery, said at least one anode member and said at least one cathode member, respectively consist essentially of components other than said components of the electrolyte.

4. A solid state rechargeable electric battery including at least an anode member and at least a cathode member, characterized in that a substantially solid electrolyte is provided between said at least one anode member and said at least one cathode member, wherein said electrolyte comprises lithium perchlorate and wherein said solid electrolyte comprises around 5–10% of the combined total weight of said at least one anode member, said at least one cathode member and said electrolyte.

5. A battery according to claim 4 wherein said electrolyte is a dried product of a mixture of liquids comprising lithium perchorate dissolved in ethylene carbonate and diethyl carbonate.

6. A battery according to claim 5 wherein lithium perchorate, ethylene carbonate and diethyl carbonate have a relative liquid weight ratio of substantially 1:1:1.

7. A battery according to claim 4 wherein, prior to assembly of the battery, said at least one anode member and said at least one cathode member, respectively consist essentially of components other than said components of the electrolyte.

8. A battery according to claim 5 wherein, prior to assembly of the battery, said at least one anode member and said at least one cathode member, respectively consist essentially of components other than said components of the electrolyte.

9. A solid state rechargeable electric battery including at least an anode member and at least a cathode member, characterized in that a substantially solid electrolyte is provided between said at least one anode member and said at least one cathode member, wherein said electrolyte is a dried product of a mixture comprising lithium perchlorate dissolved in ethylene carbonate and diethyl carbonate in a liquid state wherein the liquid weight content of the lithium perchlorate in the electrolyte is substantially $\frac{1}{3}$ of the total liquid weight content of the electrolyte.

10. A battery according to claim 9 wherein the ethylene carbonate liquid weight content of the electrolyte is up to $\frac{1}{3}$ of the total liquid weight content of the electrolyte.

11. A battery according to claim 9 wherein the diethyl carbonate liquid weight content of the electrolyte is up to $\frac{1}{3}$ of the total liquid weight content of the electrolyte.

12. A method of forming a solid state rechargeable electric battery, including the steps of:

(a) providing at least an anode member;

(b) providing at least a cathode member;

(c) providing an injectable electrolyte between said at least one anode member and said at least one cathode member; and (d) forming said electrolyte by dissolving lithium perchlorate in ethylene carbonate and diethyl carbonate, wherein said electrolyte is substantially solid when said battery is formed.

13. A method according to claim 12 wherein said lithium perchlorate, ethylene carbonate and diethyl carbonate have a relative liquid weight ratio of substantially 1:1:1.

14. A method according to claim 12 further including step (e) of injecting said electrolyte between said at least one anode member and said at least one cathode member.

15. A method according to claim 13 further including step (e) of injecting said electrolyte between said at least one anode member and said at least one cathode member.

16. A method according to claim 12 further including step (f) of drying said electrolyte.

17. A method according to claim 13 further including step (f) of drying said electrolyte.

18. A method according to claim 14 further including step (f) of drying said electrolyte.

19. A method according to claim 15 further including step (f) of drying said electrolyte.

* * * * *